March 17, 1942.    H. H. COMO    2,276,935
AERIAL DEVICE FOR AUTOMOBILES
Filed March 26, 1940    3 Sheets-Sheet 1

INVENTOR.
HUGH HAROLD COMO
BY
Richards & Geier
ATTORNEYS.

March 17, 1942.  H. H. COMO  2,276,935
AERIAL DEVICE FOR AUTOMOBILES
Filed March 26, 1940   3 Sheets-Sheet 2
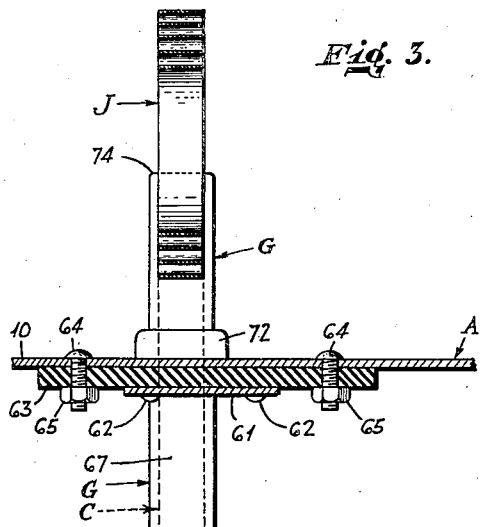
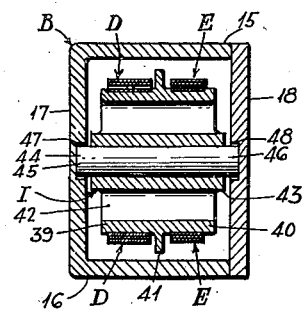
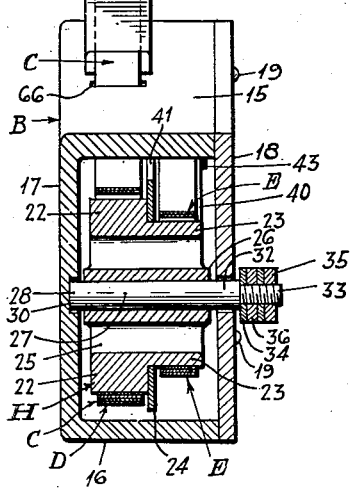
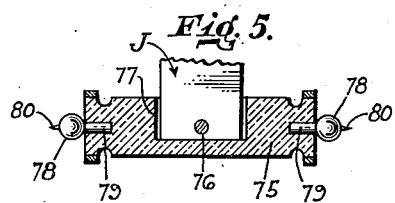
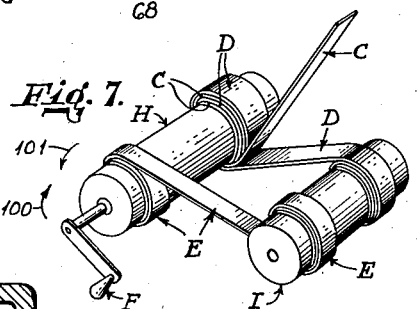
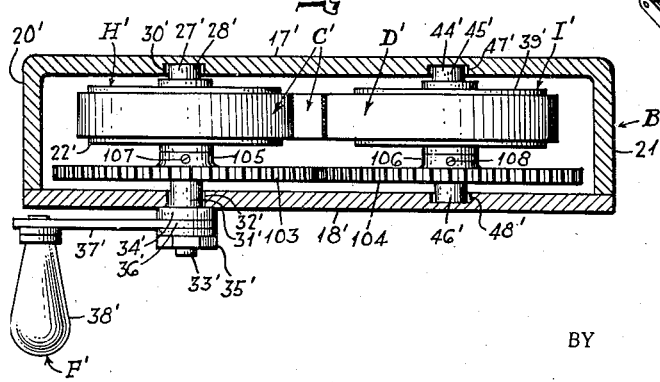
INVENTOR.
HUGH HAROLD COMO
BY
Richards & Geier
ATTORNEYS.

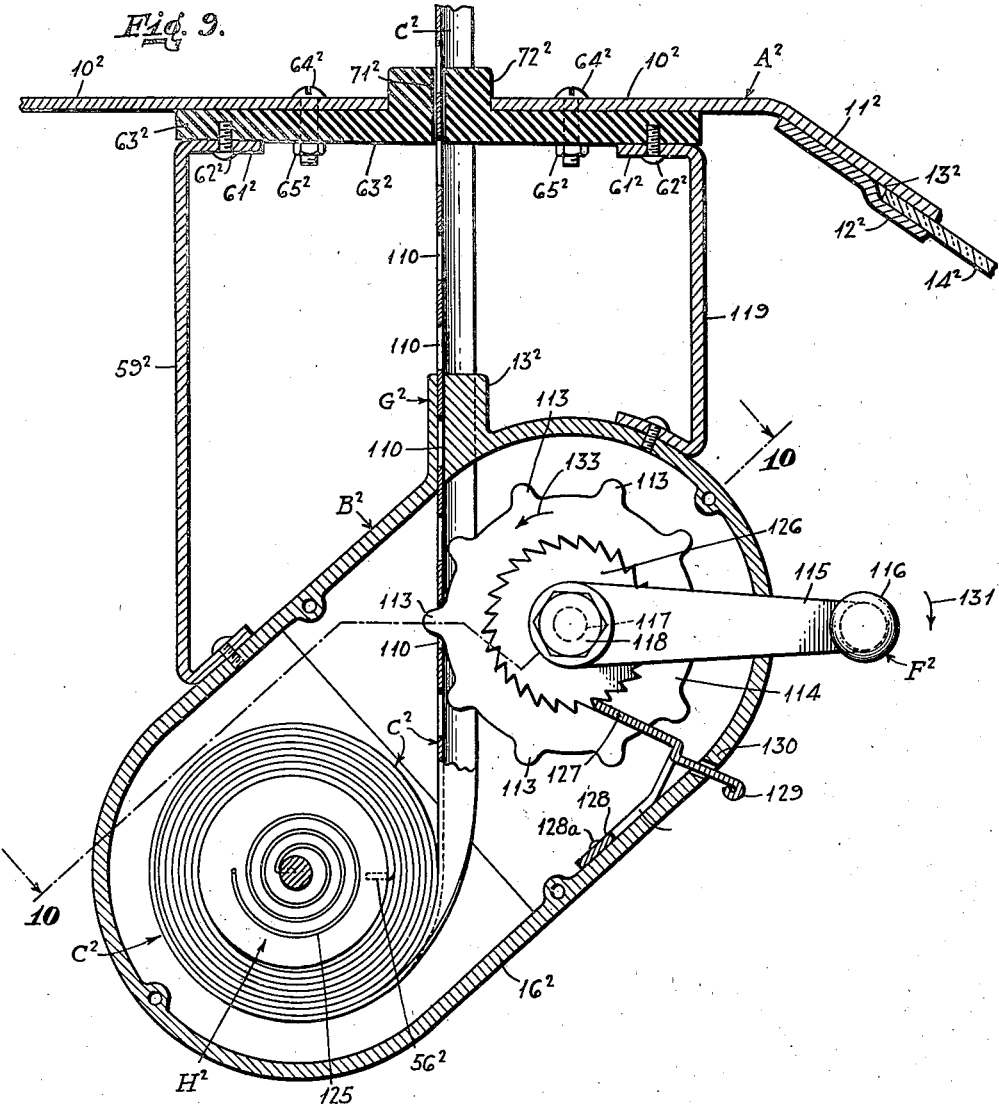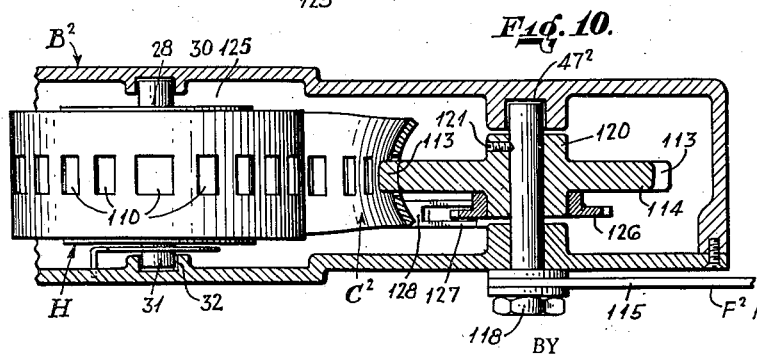

Patented Mar. 17, 1942

2,276,935

UNITED STATES PATENT OFFICE 2,276,935

AERIAL DEVICE FOR AUTOMOBILES

Hugh Harold Como, Babylon, N. Y.

Application March 26, 1940, Serial No. 325,980

15 Claims. (Cl. 250—33)

The present invention relates to an automobile aerial construction and particularly relates to an aerial which may be used in connection with the usual type of closed car.

Due to the metal body construction of passenger automobiles, considerable difficulty is experienced in obtaining proper radio reception.

It has not been found satisfactory to utilize projecting rods or external wiring because of the difficulty of insulating the same from the metallic body of the car and also because of the possibility that any considerable length of external aerial would tend either to mar the external appearance of the car or automobile or tend to get caught or snagged.

Moreover, considerable difficulty was experienced with such external rods or wires in projecting them when it was desired to use the car radio and in withdrawing or collapsing them when such withdrawal or collapse was desirable.

It is, therefore, among the objects of the present invention to provide an improved aerial construction of the character above described which will not mar or disfigure the exterior of the car which may be insulated from the metallic body of the car and which may be readily operated to be withdrawn from the exterior of the car or projected upon the exterior of the car.

Another object is to provide an improved automobile aerial construction which will enhance the radio reception of the standard or usual radio receiving set associated with automobiles and which, at the same time, may be inexpensively installed and readily repaired.

Still further objects and advantages will appear from the more detailed description set forth below, it being understood, however, that this more detailed description is given by way of illustration since various changes therein may be made by those skilled in the art without departing from the scope and spirit of the invention.

In accomplishing the above objects, it has been found most satisfactory, according to one embodiment of the present invention, to provide a metallic tape construction which may be drawn up upon a roller or spool in the interior of the car and which may be mounted inconspicuously and compactly upon the top or side of the car and, at the same time, be readily accessible for manipulation by the driver or passenger in the car.

In one preferred construction, the aerial tape is wound upon the take-up reel together with another tape holding it in position and when the aerial tape is projected to the exterior of the car to form the desired length of aerial, the contact tape may be wound upon another reel, which other reel may be directly driven, or driven by the first spool or reel, by suitable belt or tape arrangement.

Desirably, the entire reel is enclosed in the casing which may be mounted upon, and at the same time insulated from, the body of the car and the tape itself may be so conducted through a small opening in the metallic body and particularly the roof of the car so as not to contact the metal of the car.

When extended, the tape may be caused to coil a suitable number of turns depending upon the length projected.

At all times it is desirable to keep said coil sufficiently lifted above the body of the car so that there will be no contact between the coil and the body of the car, even upon relatively rough riding of the car.

It is apparent the specific illustrations shown above have been given by way of illustration and not by way of limitation and that the structures above described are subject to wide variation and modification without departing from the scope or intent of the invention all of which variations and modifications are to be included within the scope of the present invention.

In the drawings:

Figure 3 is a vertical sectional view upon the line 3—3 of Figure 1.

Figure 4 is a detailed transverse sectional view on the line 4—4 of Figure 1.

Figure 5 is a fragmentary detailed sectional view on the line 5—5 of Figure 1 upon enlarged scale as compared to Figure 1.

Figure 6 is a detailed sectional view on the line 6—6 of Figure 1 upon enlarged scale as compared to Figure 1.

Figure 7 is a diagrammatic perspective view illustrating the portion of the aerial and driving tapes of the construction of Figures 1 to 6.

Figure 8 is a transverse sectional view, similar to Figure 2, of an alternative embodiment in which the drive tape is eliminated and a gear driving arrangement is utilized.

Figure 9 is a side sectional view similar to Figure 1, illustrating still another alternative embodiment, being upon a slightly enlarged scale as compared to Figure 1.

Figure 10 is a transverse sectional view on the line 10—10 of Figure 9 illustrating the alternative driving construction.

Figure 1:
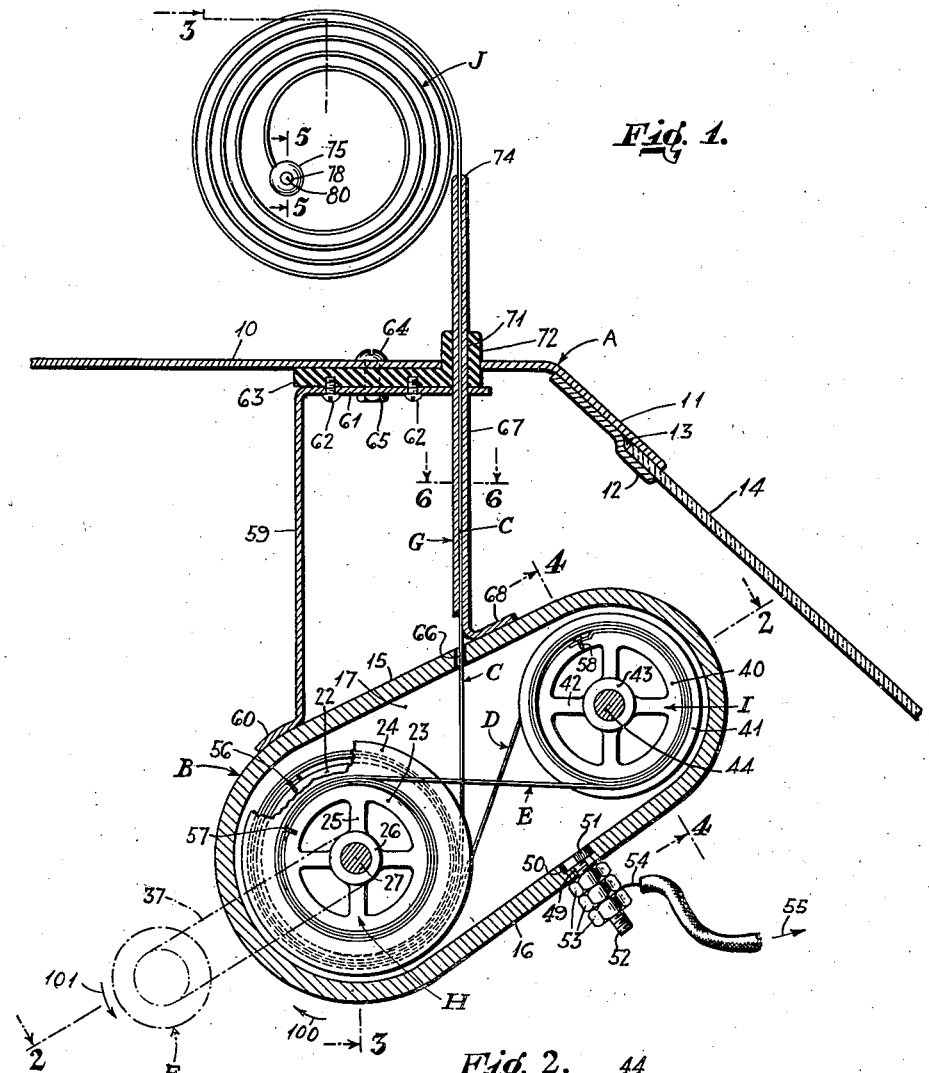
Figure 1 is a side sectional view showing a portion of the car construction and the external aerial, together with the internal take-up reels.

Referring to Figure 1, the top 10 of the car A has a forward and downward extension 11 having the sheet metal member 12 connected thereto forming a recess 13 which receives the glass windshield 14. This construction is diagrammatic and is not intended exactly to represent the automobile construction.

The aerial construction is provided with a casing B, the aerial tape C, the puller or feed tape D and the drive tape E.

Upon the exterior of the casing is provided the handle F and there is a guide G which extends through the roof of the car. Within the casing B is provided the drum H carrying the aerial and feed tapes, while above the drum H is provided the drum I carrying the puller and drive tapes.

The external aerial J takes the form of a coil and is formed by projecting the aerial tape C through the slotted guide G to the exterior of the car.

Figure 2:
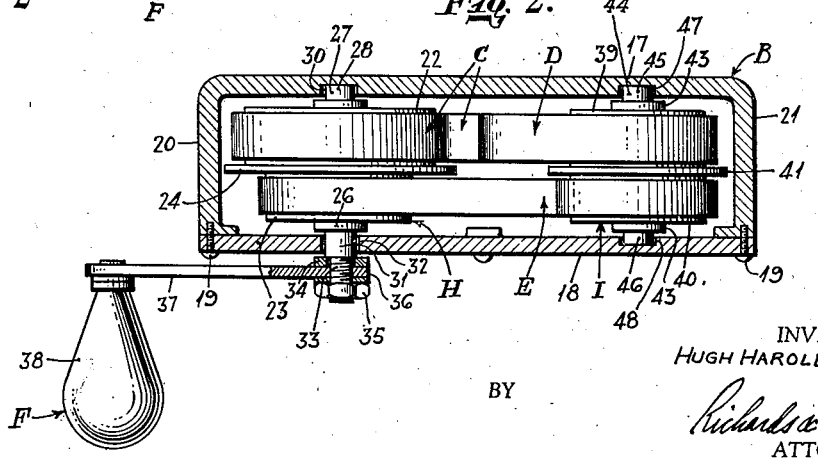
Figure 2 is a transverse sectional view upon the line 2—2 of Figure 1.

Referring particularly to Figures 1, 2 and 3, the casing B is provided with the top wall 15, the bottom wall 16 and the side walls 17, 18.

The side wall 18 takes the form of a cover plate and has screw connections, as at 19, to the rounded end portions 20, 21 of the casing A.

The spool or drum H has a large portion 22 and a relatively small portion 23, which are separated by the washer 24.

The drum itself is provided with the legs 25 which are supported on the hub 26. The hub 26 is mounted on the shaft 27. The shaft 27 has one end portion 28 mounted in the socket 30 in the wall 17 and it has another end portion 31 projecting through the opening 32 in the cover plate 18.

The hub portion 31 is threaded at 33 and receives the washer 34 and the nut 35, between which is clamped the end 36 of the lever 37 having the handle 38.

The other reel I is provided with substantially equal sized drums 39 and 40 separated by the ridge 41. These drums 39 and 40 are carried by the legs 42 upon the hub 43 of the shaft 44.

The shaft 44 has projections 45, 46, which fit in the recesses 47, 48 in the wall 17 and in the cover 18 of the chamber B respectively.

In the lower wall 16 of the chamber B is provided the opening 49 and the recess 50 which receive the nut 51 and threaded shank 52. The threaded shank 52 receives the nuts 53 between two of which is connected the wire 54 leading to the radio set, as indicated at 55.

The tapes C, D and E are connected to said drums H and I by the rivets or screws 56, 57 and 58.

Both the tapes C and D are wound tightly upon the drum portion 22 which prevents the tape C from extending into the interior of the chamber B.

The tape E, which is the drive tape, is also wound upon the small drum 23 of the spool or reel H.

It will be noted by reference to Figures 1 and 7 that the tapes D and E are also wound upon the hubs 39 and 40 reversely to their direction of winding upon the spool or reel H.

The casing B is connected by the bracket 59 to the roof of the car 10. The bracket 59 has a foot 60 connected to the casing B and also the outwardly directed flange 61 is screwed at 62 to the interposed insulating material 63.

The screw 64 having the nut 65 may be made of an insulating material so as to prevent electrical communication between the car body A and the casing B.

The tape C is designed to pass through the slot 66 in the wall 15 of the casing B through the guide member 67 which is connected by the foot 68 to the wall 15. The member 67 is formed of a sheet of metal, as best shown in Figure 6, and is folded over to form the front face 68 and the split rear face 69 with the edges of the sheet abutting at 70.

This guide 67 extends at 71 through a boss 72 located at one end of the insulating material 63, and projects to a point 74 substantially above the top of the car 10. The guide 67 should project sufficiently above the car so that the coil J will not tend to contact the top of the car even when in maximum extended position.

The end of the tape J is attached to a weight or spacer member 75 by the rivet 76 in the socket or slot 77.

The ends of the weight member 75 carry the studs 78 having shanks 79 stuck in the member 75 and having points 80 to enhance the electrical properties.

In operation, in retracting the tape J, the reel H, when turned in the direction indicated by the arrow 100, will cause the tape E to be unwound from the drum H and wound upon the drum I and, at the same time, will cause the two tapes C and D to be wound upon the drum H. This winding may be continued until the tape C has been substantially all drawn back through the guide G. The slack which normally occurs in the bands in commercial construction is sufficient to prevent locking of the bands in extreme positions.

The tape D will be wound upon the drum 1 while the tape C will be projected up through the guideway 67 to form the coil aerial J which will position itself as indicated above the top of the car 10.

The width and closeness of winding of the coil J should be so controlled that there will be no danger of it contacting the top of the car. The resiliency of the wire should be such that a relatively close coil will form.

If desired, the wire may be slightly concave, but a flat wire may also be satisfactorily employed.

In projecting the aerial, the reel may be turned in the direction 101 whereupon the tapes C and D will be unwound together from the drum H, as the tape E is unwound from the drum I and back onto the drum H.

The friction of the tape C in passing through the guide 67 should be such as to prevent movement of the tape without positive actuation by the lever and handle 37, 38.

In the alternative construction shown in Figure 8, similarly functioning parts being indicated by the same letters and numerals primed, the drive tape is eliminated and only the aerial and feed tapes C' and D' are employed.

Mounted on the shafts 27' and 44' are the spur gears 103 and 104 which mesh with each other and which have hubs 105 and 106 fixed by the set screws 107 and 108 to the shafts 27' and 44'.

The friction of the tape C' in passing through the guide (not shown) should be sufficient to prevent either projection or retraction of the tape without positive actuation by the handle 38'.

In the embodiment of Figures 9 and 10 is shown still another alternative embodiment, correspondingly functioning parts being indicated by the same letters and numerals as in Figures 1 to 8, provided, however, with a superior "2".

In this construction the aerial tape $C^2$ is carried upon the drum $H^2$ which carries the rewind spring at 125. The tape $C^2$ is connected to the drum $H^2$ at $56^2$. The tape has a series of openings therein, as indicated at 110 at the center of the tape $C^2$.

These recesses 110 match the teeth 113 and the sprocket wheel 114 which may be operated by the lever 115 and the handle 116, which lever 116 is attached to the shaft 117 by the nut 118.

It will be noted that the casing $B^2$ is provided with an additional connection 119 to the cover of the car $10^2$, and the guide member G has been omitted.

As indicated, the hub 120 of the sprocket is fixed in position by the set screw 121 upon the shaft 117 (see Figure 10).

The shaft 117 is also provided with the ratchet 126 having the pawl 127. The pawl 127 is made of resilient sheet stock and has a leg 128 which is riveted at $128a$ to the lower wall $16^2$ of the casing $B^2$.

The pawl also has an extension 129 projecting through the slot 130 in the casing $B^2$ by which the pawl may be released.

In operation, when the handle 116 is turned in the direction 131, the pawl 127 will snap by the teeth of the ratchet 126 and project the tape $C^2$ through the boss 132 on the top of the casing $B^2$, and through the boss $72^2$ of the insulating material $63^2$.

This will be done against the action of the spring 125.

When it is desired to withdraw the aerial tape $C^2$ from the exterior of the car, the pawl 127 is released permitting the spring 125 to rewind the tape and, if desired, a ball clutch arrangement may be provided upon the shaft 117 permitting the sprocket wheel 113 to turn in the direction 133 without turning the handle 116.

The spring 125, at all times, will keep the tape $C^2$ tightly wound upon the hub $H^2$. Although it is preferred to have the tape $C^2$ coil itself above the top $10^2$, the concavity of the tape $C^2$ may be such that the tape can be caused to stand upright and have sufficient stiffness to oppose to the air current 134 and thus prevent collapse of the tape $C^2$ back against the top $10^2$.

It is apparent the specific illustrations shown above have been given by way of illustration and not by way of limitation and that the structures above described are subject to wide variation and modification without departing from the scope or intent of the invention, all of which variations and modifications are to be included within the scope of the present invention.

What is claimed is:

1. A retractible automobile aerial construction for an automobile of the closed sheet metal body type having an opening to permit projection and retraction of the aerial, said aerial including a metal aerial tape designed to be coiled above the outside of the automobile when projected and another tape to be coiled inside of the automobile to keep said aerial tape in tightly coiled condition when retracted, said construction including drum means upon which both of said tapes are to be coiled together with the second tape being coiled on the outside of the first tape and a second drum means upon which said last mentioned tape is coiled when said first mentioned tape is projected onto the top of the automobile, both of said tapes being attached to the first drum means and the last mentioned tape being attached to the second drum means.

2. A retractible automobile aerial construction for an automobile of the closed sheet metal body type having an opening to permit projection and retraction of the aerial, said aerial including a metal aerial tape designed to be coiled above the outside of the automobile when projected, a reel positioned inside of the car upon which said tape may be wound on retraction of the aerial and from which it may be unwound upon projection of the tape and means to hold said tape tightly wound upon said reel when said tape is retracted upon said reel.

3. A retractible automobile aerial construction for an automobile of the closed sheet metal body type having an opening to permit projection and retraction of the aerial, said aerial including a metal aerial tape designed to be coiled above the outside of the automobile when projected, a reel carrying said metal tape, a driving tape connected to said reel and another reel for taking up said driving tape, said driving tape being interleaved with said aerial tape when said tapes are coiled upon said reel.

4. A retractible automobile aerial construction for an automobile of the closed sheet metal body type having an opening to permit projection and retraction of the aerial, said aerial including a metal aerial tape designed to be coiled above the outside of the automobile when projected, a guide member extending vertically through the top of the car for said tape, an insulating member for mounting said guide member upon the top of the car and reel members to permit reeling and unreeling of the tape.

5. A retractible automobile aerial construction for an automobile of the closed sheet metal body type having an opening to permit projection and retraction of the aerial, said aerial including a metal aerial tape designed to be coiled above the outside of the automobile when projected, a feed tape to be coiled around said aerial tape and a drive tape to cause projection or retraction of said aerial tape, a plurality of reels upon which said tapes may be wound and means to cause said tapes to be coiled upon one of said reels or to be uncoiled from one of said reels, the uncoiling of said aerial tape resulting in projection of said aerial tape upon the outside of the automobile through said opening.

6. A retractible automobile aerial construction for an automobile of the closed sheet metal body type having an opening to permit projection and retraction of the aerial, said aerial including a metal aerial tape designed to be coiled above the outside of the automobile when projected, a feed tape to be coiled around said aerial tape and a drive tape to cause projection or retraction of said aerial tape and a plurality of reels upon which said tapes may be wound, one of said reels serving to reel up the aerial tape and the feed tape on one side thereof when turned in one direction and the drive tape on the other side thereof and the other reel serving to wind the feed tape when turned in one direction and the drive tape when turned in the other direction.

7. A retractible automobile aerial construction for an automobile of the closed sheet metal body type having an opening to permit projection and retraction of the aerial, said aerial including a metal aerial tape designed to be coiled above the outside of the automobile when projected, a feed tape to be coiled around said aerial tape and a drive tape to cause projection or retraction of said aerial tape and a plurality of reels upon which said tapes may be wound, said reels being received in a casing and means sustaining said casing from the body of the car and insulating said casing from said body of the car, and said aerial tape, said feed tape and said drive tape being all coiled upon one of said reels upon retraction, the aerial tape and the feed tape being interleaved upon said retraction.

8. A retractible automobile aerial construction for an automobile of the closed sheet metal body type having an opening to permit projection and retraction of the aerial, said aerial including a metal aerial tape designed to be coiled above the outside of the automobile when projected, a feed tape to be coiled around said aerial tape and a drive tape to cause projection or retraction of said aerial tape and a plurality of reels upon which said tapes may be wound, said reels being received in a casing and means sustaining said casing from the body of the car and insulating said casing from said body of the car, said casing having bearings for said reels, said aerial tape, said feed tape and said drive tape being coiled upon one of said reels and said aerial tape and said feed tape being interleaved upon retraction and coiling of said tapes upon said reel.

9. A retractible automobile aerial construction for an automobile of the closed sheet metal body type having an opening to permit projection and retraction of the aerial, said aerial including a metal aerial tape designed to be coiled above the outside of the automobile when projected, a feed tape to be coiled around said aerial tape to retain said aerial tape when retracted, and a drive tape to cause projection or retraction of said aerial tape and a plurality of reels upon which said tapes may be wound, said reels being received in a casing and means sustaining said casing from the body of the car and insulating said casing from said body of the car, said casing having bearings for said reel and means to drive one of said reels to cause said aerial tape to be uncoiled from such reel and to be coiled upon the outside of the automobile.

10. A retractible automobile aerial construction for an automobile of the closed sheet metal body type having an opening to permit projection and retraction of the aerial, said aerial including a metal aerial tape designed to be coiled above outside of the automobile when projected, a holder tape to be coiled around said aerial tape when said aerial tape is retracted from the outside of the automobile, and a sprocket arrangement to cause projection and retraction of the aerial tape.

11. A retractible automobile aerial construction for an automobile of the closed sheet metal body type having an opening to permit projection and retraction of the aerial, said aerial including a metal aerial tape designed to be coiled above outside of the automobile when projected, a holder tape to be coiled around said aerial tape when said aerial tape is retracted from the outside of the automobile, and a gear arrangement to cause projection or retraction of the aerial tape.

12. A retractible automobile aerial construction for an automobile of the closed sheet metal body type having an opening to permit projection and retraction of the aerial, said aerial including a casing, a metal aerial tape designed to be coiled above the outside of the automobile when projected, a holder tape to be coiled around said aerial tape, when said aerial tape is retracted, said holder tape to be coiled around said aerial tape only upon retraction of said aerial tape, and to keep said aerial tape from uncoiling when retracted and actuating means to cause projection or retraction of said aerial tape, said actuating means including a plurality of reels upon which said tapes may be wound, said reels being received in said casing and means supporting said casing from the body of the automobile and insulating said casing from said body of the automobile, said casing having bearings for said reels.

13. A retractible automobile aerial construction for an automobile of the closed sheet metal body type having an opening to permit projection and retraction of the aerial, said aerial including a casing, a metal aerial tape designed to be coiled above the outside of the automobile when projected, a holder tape to be coiled around said aerial tape and to keep said aerial tape from uncoiling when retracted and actuating means to cause projection or retraction of said aerial tape, said actuating means including a plurality of reels upon which said tapes may be wound, said reels being received in said casing and means sustaining said casing from the body of the automobile and insulating said casing from said body of the automobile, said casing having bearings for said reels, said actuating means also including intermeshing gears mounted on the same centers as said reels and manual means to drive one of said gears, said holder tape being interleaved with said aerial tape when aerial tape is retracted and coiled upon one of said reels.

14. A retractible automobile aerial construction for an automobile of the closed sheet metal body type having an opening to permit projection and retraction of the aerial, said aerial including a casing, a metal aerial tape designed to be coiled above the outside of the automobile when projected, a holder tape to be coiled around said aerial tape and to keep said aerial tape from uncoiling when retracted and actuating means to cause projection or retraction of said aerial tape, said actuating means including a plurality of reels upon which said tapes may be wound, said reels being received in said casing and means sustaining said casing from the body of the automobile and insulating said casing from said body of the automobile, said casing having bearings for said reels, one of said reels receiving both said reel tape and said holder tape and the other of said reels receiving only said holder tape, said actuating means also including a handle to drive said reel receiving both said aerial tape and said holder tape and a connection between said reels to drive one of said reels from the other of said reels, said holder tape being interleaved with said aerial tape when aerial tape is retracted and coiled upon one of said reels.

15. A retractible automobile aerial construction for an automobile of the closed sheet metal body type having an opening to permit projection and retraction of the aerial, said aerial including a casing, a metal aerial tape designed to be coiled above the outside of the automobile when projected, a holder tape to be coiled around said aerial tape and to keep said aerial tape from uncoiling when retracted, a drum to receive said aerial tape and said holder tape, means to drive said drum, a second drum to receive said holder tape from said first drum when said aerial tape is projected, and means to drive said second drum from said first drum, said aerial tape being interleaved with said holder tape when said aerial tape is retracted and coiled upon said first drum.

HUGH HAROLD COMO.